Oct. 4, 1949.                F. W. TURRETTINI                2,483,743
            DEVICE FOR CENTERING THE SPINDLE OF MACHINE TOOLS
Filed March 31, 1948                                    2 Sheets—Sheet 1
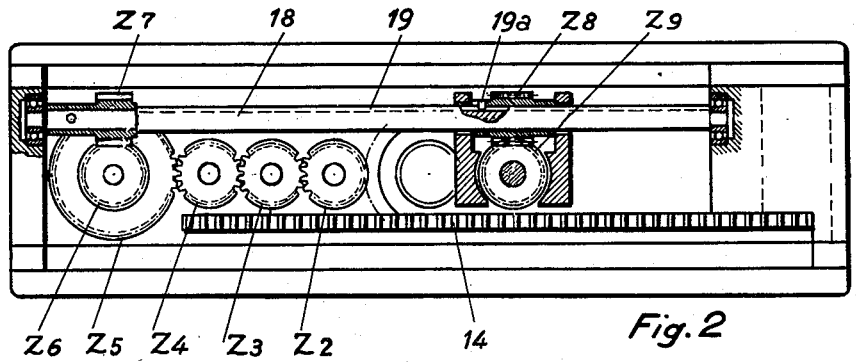
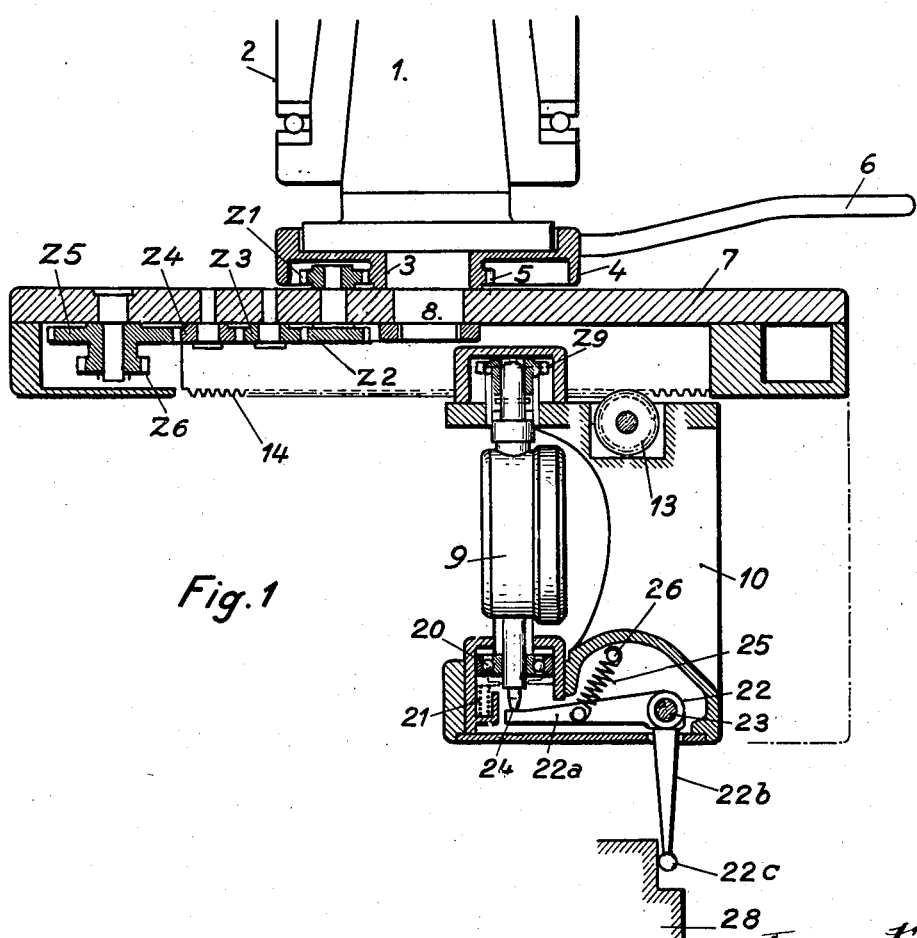
Inventor
FERNAND WILLIAM TURRETTINI
By Robert E. Burr
    Attorney Oct. 4, 1949.　　　F. W. TURRETTINI　　　2,483,743
DEVICE FOR CENTERING THE SPINDLE OF MACHINE TOOLS
Filed March 31, 1948　　　　　　　　　　2 Sheets-Sheet 2
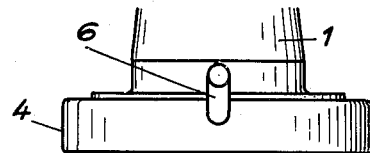
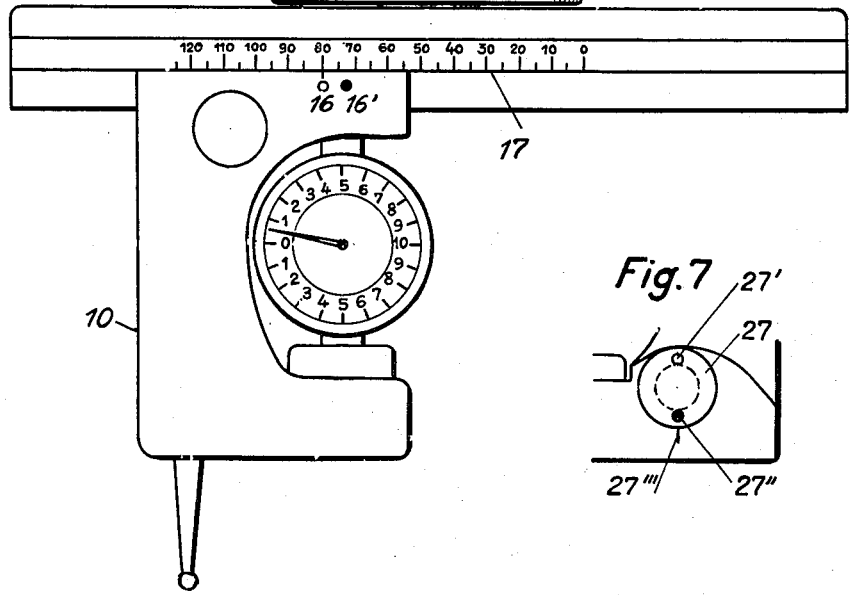
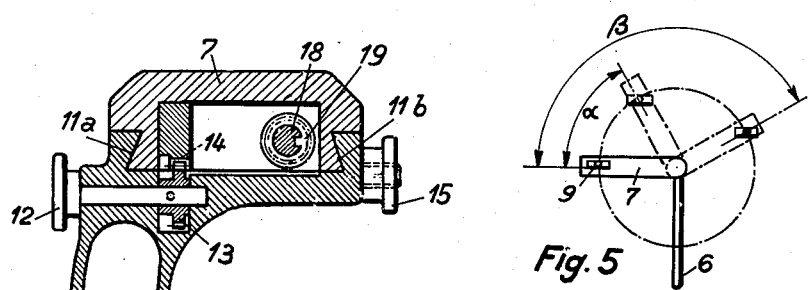
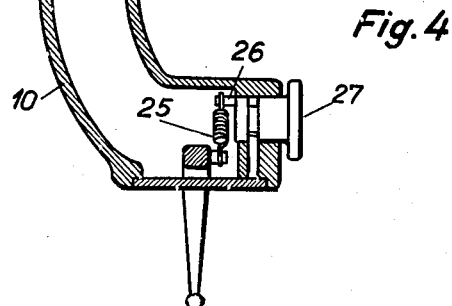
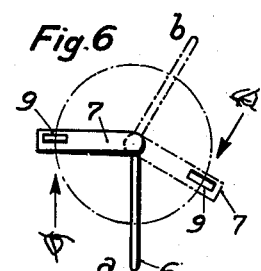
Inventor:
FERNAND WILLIAM TURRETTINI,
By Robert E. Burns
Attorney

UNITED STATES PATENT OFFICE 2,483,743

DEVICE FOR CENTERING THE SPINDLE OF MACHINE TOOLS

Fernand William Turrettini, Geneva, Switzerland, assignor to Societe Genevoise d'Instruments de Physique, Geneva, Switzerland, a firm of Switzerland Application March 31, 1948, Serial No. 18,205
In Switzerland April 10, 1947

2 Claims. (Cl. 33—172)

This invention relates to centering devices for machine tools.

In order to center the machine tool spindle in the axis of a bore or of a cylindrical body of a work piece, centering devices with a comparator are generally used, which are mounted on an arm secured to the spindle, whereby the pointer of the comparator indicates on the dial the centering deviation of the spindle or of the work piece.

In the known centering devices the comparator usually rotates with the spindle so that, according to the angular position of the spindle, the dial will take a different position, thus being more or less visible for a determined position of the observator.

This drawback is particularly disturbing with the large sized machine tools the spindles of which are hardly accessible, in as much as the operator must move all round the machine to observe the dial in the various angular positions of the spindle.

It is an object of the present invention to provide an improved centering device whereby this inconvenience can be removed. This device comprises an arm secured to the spindle, for instance by means of a taper, and carrying an adjustable feeler-holder slide and a comparator. An important feature of the invention resides in the provision of a stop handle dependent on a toothed gear controlling a gear train whose gearing ratio is chosen so as to transmit to the comparator a rotatory motion which is opposite in direction and equal in speed to that of the spindle, whereby the dial of the comparator will constantly be held oriented in the direction chosen by the observator whatever the angular position of the spindle may be.

The annexed drawing illustrates by way of example a form of construction of my improved centering device.

Fig. 1 is a longitudinal section thereof;
Fig. 2 is a bottom plan view thereof;
Fig. 3 is a front elevation thereof;
Fig. 4 is a cross-section of the slide;
Fig. 5 illustrates diagrammatically the orientation of the comparator with respect to the stop handle for different angular positions of the spindle;
Fig. 6 illustrates diagrammatically the constant orientation of the comparator with respect to the stop handle for different positions of this latter; and
Fig. 7 shows a detail in front elevation.

The clamping taper 1, which is mounted in the spindle 2 for rotation therewith, comprises a cylindrical seat 3 on which is loosely mounted a ring 4 formed integral with a stop handle 6 by means of which the operator can stop the ring 4 to observe the comparator.

An arm 7 is secured to the end portion 8 of the clamping taper 1 for rotation therewith; the arm 7 carries a pinion $z^1$ meshing with the toothed crown 5 on seat 3 and transmitting the rotation thereof to the comparator 9 through the medium of a gear train $z^2$ to $z^9$ when the ring 4 is stopped.

The comparator 9 is vertically mounted on a slide 10 shiftable longitudinally on the arm 7 on a dovetailed guide rail $11^a$, $11^b$ as shown in Fig. 4. The slide 10 can be shifted by means of a knob 12 secured to the shaft of a pinion 13 meshing with a rack 14 provided on the arm 7. A further knob 15 is designed to lock, by conventional locking means, the slide in the desired position, which position can be determined by an index 16 movable in front of a graduated scale 17. A similar index 16' is provided to determine the position of the slide when checking inner diameters.

In order to enable the gears $z^8$ and $z^9$ to follow the displacements of the slide 10, the shaft 18 is provided with a longitudinal groove 19 in which shiftably engages a key $19^a$ secured to the gear $z^8$.

The gear $z^9$ (Fig. 1) is connected to the comparator 9 by conventional coupling means and drives it in rotation. The comparator 9 is supported at its lower end in a ball bearing 20 and held vertically in place by springs 21.

A crank lever 22 is pivoted about a stud 23 secured to the lower portion of the slide. The lever arm $22^a$ whose extremity bears on the feeler 24 of the comparator, transmits to the latter the oscillations of the other lever arm $22^b$ whose feeler $22^c$ contacts with the work piece 28 to be checked.

A spring 25 is attached at its one end to the lever arm $22^a$ and at its other end to an eccentric stud 26 which can be operated by means of a knob 27. For checking outer diameters, the spring 25 will be tensioned to insure contact of lever arm $22^a$ with feeler 24. For checking inner diameters, the spring 25 will be released by turning the knob 27; the contact of the arm $22^a$ with the feeler 24 will be insured by the inner spring (not shown) of the comparator. The knob 27 is provided with two marks 27' and 27'' indicating when facing the index 27''', the tensioned or released condition of spring 25, respectively.

The gear ratio of the gear train $z^1$ to $z^9$ is chosen so that upon stopping of the ring 4 by means of the stop handle 6, the rotation performed by the comparator about its axis will be constantly equal to that of the spindle but reverse in direction. The orientation of the comparator with respect to the stop handle will thus not vary, whatever the angle may be through which the spindle has been rotated. This orientation will be determined so as to facilitate reading of the dial.

The Fig. 5 illustrates diagrammatically the constant orientation of the comparator 9 for a rotation of the arm 7 through either an angle $\alpha$ or an angle $\beta$.

In Fig. 6 it is diagrammatically shown that for any stop position $a$ or $b$ of the handle 6, the orientation of the comparator with respect to the said handle will be constant and such that the comparator dial will face the operator.

What I claim is:

1. In combination with the spindle of a machine tool, a device for centering said spindle on the axis of a work piece to be machined, said device comprising an arm secured to said spindle, a comparator-holder slidingly mounted on said arm, a dial comparator rotatably mounted in said comparator holder, a toothed gear loosely mounted on said spindle and having rigid therewith a stop handle, a gear train in said arm having meshing engagement with said toothed gear and driving connection with said dial comparator and adapted to transmit the rotation of said spindle to the comparator, the gearing ratio of said gear train being chosen so as to transmit a rotation equal in speed and reverse in direction to that of said spindle, whereby upon actuation of said stop handle the comparator dial remains oriented in the direction chosen by the operator, whatever the angular position of the spindle may be.

2. In combination with the spindle of a machine tool a device for centering said spindle on the axis of a work piece to be machined, said device comprising an arm secured to said spindle, a comparator-holder slidingly mounted on said arm, a dial comparator rotatably mounted in said comparator holder, a toothed gear loosely mounted on said spindle and having rigid therewith a stop handle, a gear train in said arm having meshing engagement with said toothed gear, a shaft in said arm, a gear fixedly secured on said shaft and having meshing engagement with said gear train, a gear slidingly mounted on said shaft for rotation with said shaft and having driving connection with said dial comparator, whereby the rotation of said spindle is transmitted to the comparator, the gearing ratio of the gears being chosen so as to transmit a rotation equal in speed and reverse in direction to that of said spindle, whereby upon actuation of said stop handle the comparator dial remains oriented in the direction chosen by the operator, whatever the angular position of the spindle may be.

FERNAND WILLIAM TURRETTINI.

REFERENCES CITED

The following references are of record in the file of this patent:

UNITED STATES PATENTS

| Number | Name | Date |
| --- | --- | --- |
| 398,664 | Sleeper | Feb. 26, 1889 |
| 1,056,186 | Laplant | Mar. 18, 1913 |
| 1,241,469 | Payne | Sept. 25, 1917 |